United States Patent
Yip et al.

(10) Patent No.: US 10,434,644 B2
(45) Date of Patent: Oct. 8, 2019

(54) POSITION/FORCE CONTROL OF A FLEXIBLE MANIPULATOR UNDER MODEL-LESS CONTROL

(71) Applicant: The Board of Trustees of the Leland Stanford Junior University, Stanford, CA (US)

(72) Inventors: Michael C. Yip, Stanford, CA (US); David B. Camarillo, Stanford, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 60 days.

(21) Appl. No.: 15/523,648

(22) PCT Filed: Nov. 2, 2015

(86) PCT No.: PCT/US2015/058651
§ 371 (c)(1),
(2) Date: May 1, 2017

(87) PCT Pub. No.: WO2016/073367
PCT Pub. Date: May 12, 2016

(65) Prior Publication Data
US 2017/0312920 A1  Nov. 2, 2017

Related U.S. Application Data

(60) Provisional application No. 62/074,475, filed on Nov. 3, 2014.

(51) Int. Cl.
*B25J 9/16* (2006.01)
*B25J 13/08* (2006.01)
(Continued)

(52) U.S. Cl.
CPC ............. *B25J 9/1607* (2013.01); *B25J 9/104* (2013.01); *B25J 9/1075* (2013.01); *B25J 13/085* (2013.01); *B25J 18/06* (2013.01)

(58) Field of Classification Search
CPC ...... B25J 9/1607; B25J 13/085; B25J 9/1075; B25J 9/104; B25J 18/06
(Continued)

(56) References Cited

U.S. PATENT DOCUMENTS

| 6,278,906 B1 | 8/2001 | Piepmeier et al. |
| 8,301,421 B2 | 10/2012 | Bacon et al. |

(Continued)

FOREIGN PATENT DOCUMENTS

| EP | 2 497 610 | 9/2012 |
| JP | 3029286 B2 | 6/1992 |
| JP | 2014-108466 A | 6/2014 |

OTHER PUBLICATIONS

Cheah, C.C. et al. (1998) "Feedback Control for Robotic Manipulator with Uncertain Kinematics and Dynamics," Proceedings of the 1998 IEEE International Conf. on Robotics & Automation, Leaven, Belgium:3607-3612.
(Continued)

*Primary Examiner* — Jaime Figueroa
(74) *Attorney, Agent, or Firm* — Foley & Lardner LLP; Cliff Z. Liu

(57) ABSTRACT

A method includes receiving position information and force information, providing control commands to a steering mechanism of a continuum manipulator based on the position information and the force information, updating a control matrix based on the position information and the provided control commands, and providing updated control commands to the steering mechanism based on the updated control matrix. A continuum manipulator includes a body, a
(Continued)

steering mechanism configured to steer the body, sensors, and a controller. The sensors include a position sensor to detect a position of the body and a force sensor to detect a force against the body. The controller is configured to receive position information from the position sensor and force information from the force sensor, provide control commands to the steering mechanism based on the position information and the force information, and update a control matrix based on the position information and the provided control commands.

20 Claims, 14 Drawing Sheets

(51) Int. Cl.
*B25J 9/10* (2006.01)
*B25J 18/06* (2006.01)

(58) Field of Classification Search
USPC .................................. 700/245, 263
See application file for complete search history.

(56) References Cited

U.S. PATENT DOCUMENTS

| | | | |
|---|---|---|---|
| 8,364,308 B2 | 1/2013 | Hong et al. | |
| 8,406,989 B1 | 3/2013 | Bhattacharyya et al. | |
| 8,442,685 B2 | 5/2013 | Ooga et al. | |
| 8,460,236 B2 | 6/2013 | Roelle et al. | |
| 9,132,552 B2* | 9/2015 | Seo | B25J 3/04 |
| 9,488,971 B2* | 11/2016 | Yip | G05B 15/02 |
| 2002/0015934 A1* | 2/2002 | Rubbert | A61C 7/00 |
| | | | 433/29 |
| 2010/0256558 A1* | 10/2010 | Olson | A61B 34/20 |
| | | | 604/95.01 |
| 2011/0060460 A1* | 3/2011 | Oga | B25J 9/1633 |
| | | | 700/254 |
| 2011/0066160 A1 | 3/2011 | Simaan et al. | |
| 2011/0071677 A1 | 3/2011 | Stilman | |
| 2011/0230894 A1 | 9/2011 | Simaan et al. | |
| 2011/0319714 A1 | 12/2011 | Roelle et al. | |
| 2012/0210802 A1 | 8/2012 | Sarh et al. | |
| 2012/0330198 A1 | 12/2012 | Patoglu | |
| 2013/0041508 A1 | 2/2013 | Hu et al. | |
| 2013/0158978 A1 | 6/2013 | Banke et al. | |
| 2013/0165945 A9 | 6/2013 | Roelle et al. | |
| 2014/0156066 A1 | 6/2014 | Sakano | |
| 2014/0257569 A1* | 9/2014 | Yip | G05B 15/02 |
| | | | 700/275 |
| 2014/0330432 A1* | 11/2014 | Simaan | B25J 9/1633 |
| | | | 700/250 |
| 2015/0148952 A1* | 5/2015 | Shiratsuchi | B25J 9/1682 |
| | | | 700/248 |

OTHER PUBLICATIONS

Cheah, C.C. (2003) "Approximate Jacobian Robot Control with Adaptive Jacobian Matrix," Proceedings of the 42nd IEEE Conf. on Decision and Control, Maui, Hawaii:5859-5864.
Codourey, A. et al. (1997) "A Body-oriented Method for Dynamic Modeling and Adaptive Control of Fully Parallel Robots," IEEE International Conference on Robotics and Automation, Albuquerque.
Shademan, A. (2012) "Uncalibrated Vision-Based Control and Motion Planning of Robotic Arms in Unstructured Environments," Univ. of Alberta, Dept. of Computing Science, Thesis.
Non-Final Office Action in U.S. Appl. No. 14/197,739, dated Apr. 13, 2016.
Notice of Allowance in U.S. Appl. No. 14/197,739, dated Jul. 25, 2016.
International Search Report and Written Opinion (ISA/KR) in International Application No. PCT/US2015/058651, dated Feb. 1, 2016.

* cited by examiner

POSITION/FORCE CONTROL OF A FLEXIBLE MANIPULATOR UNDER MODEL-LESS CONTROL

CROSS-REFERENCE TO RELATED PATENT APPLICATIONS

This application is a national phase entry under 35 U.S.C. § 371 of International Application No. PCT/US2015/058651, filed Nov. 2, 2015, which in turn claims the benefit of U.S. Provisional Patent Application 62/074,475 filed Nov. 3, 2014, the contents of each of which are incorporated herein by reference in their entireties.

BACKGROUND

Traditional robotic control techniques rely on an accurate model of the manipulator in order to solve for joint displacements and torques. Because continuum manipulators can be conformed by the environment into irregular and unpredictable configurations, they are difficult to model. Modeling of the kinematics and mechanics of the many different forms of continuum manipulators depends heavily on the specific configuration of the actuation mechanism, material composition, and build quality to model the systems properly. Model-based control further relies on having a precise calibration between the model and the manipulator. Generally, model-based control techniques are unable to account for unknown environmental constraints, leading to instabilities or workspace limitations.

SUMMARY

In one aspect, a continuum manipulator includes a body, a steering mechanism configured to steer the body, sensors, and a controller. The sensors include at least one position sensor configured to detect a position of the body and at least one force sensor configured to detect a force against the body. The controller is configured to receive position information from the position sensor and force information from the force sensor, provide control commands to the steering mechanism based on the position information and the force information, and update a control matrix based on the position information and the provided control commands.

In another aspect, a method includes receiving position information and force information related to a continuum manipulator, providing control commands to a steering mechanism of the manipulator based on the position information and the force information, updating a control matrix based on the position information and the provided control commands, and providing updated control commands to the steering mechanism based on the updated control matrix.

DETAILED DESCRIPTION

Figure 1A:
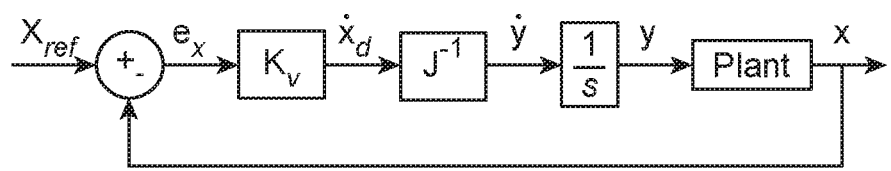
FIG. 1A illustrates an embodiment of a task-space closed loop controller including a Jacobian matrix, for continuous time control.

In embodiments of the present disclosure, model-less control is incorporated for a continuum manipulator. In embodiments of the present disclosure, model-less control with position/force control is incorporated for a continuum manipulator to regulate end-effector forces. By combining position/force control with model-less control, the continuum manipulator may operate in more types of tasks and in more environments.

As described and illustrated with respect to embodiments of the present disclosure, model-less position control is a viable and effective technique for controlling continuum manipulators in a constrained, unknown environment. Model-less control allows the manipulator to be controlled without a kinematics or mechanics model of the continuum manipulator. The controller adapts to constraints in the environment autonomously, avoiding workspace limitations and instabilities that would otherwise arise from model-based control. This technique offers a powerful solution for controlling continuum manipulators within constrained and unknown environments. Successful position tracking using model-less control has been shown in environments where model-based control exhibited poor or unstable performance.

As also described and illustrated with respect to embodiments of the present disclosure, position/force control in combination with model-less control allows for further improved control of manipulators in unknown environments and configurations. Without position/force control, end-effector or tip constraints can result in position errors, which may be integrated in closed-loop control schemes and can lead to actuator wind-up instability, which can in turn result in damage to the manipulator or to its environment. As described in the present disclosure, position/force control provides for regulation and control of interaction forces and avoidance of actuator wind-up. Two techniques for position/force control are described below by way of example: one derived from a stiffness technique and another from a Jacobian-transpose technique.

Experimental results are also provided, illustrating performance of model-less controllers according to embodiments of the present disclosure, in a variety of environments ranging from simple unconstrained tip-based interactions to interactions with complex, multi-contact constraints.

Cartesian Closed-Loop Control:

To effectively control interaction forces between a model-less continuum manipulator and its unknown environment, a closed-loop controller is used. The closed-loop controller utilizes a local-linear Jacobian mapping between actuator displacement and manipulator end-effector displacement. Let f(y)=x represent the forward-kinematics of the manipulator, where y=[$y_1 \ldots y_m$]$^T$ represents actuator positions. By differentiating both sides, the Jacobian matrix J is derived, as shown in equations (1)-(3), where J is the manipulator Jacobian matrix at the location defined by {x, y}, and changes over the workspace.

$$\dot{x} = J\dot{y} \quad (1)$$

$$\Delta x \approx J \Delta y \quad (2)$$

where $$J = \left[ \frac{\partial x}{\partial y_1} \cdots \frac{\partial x}{\partial y_m} \right] \quad (3)$$

FIG. 1A illustrates an embodiment of a task-space closed loop controller including a Jacobian matrix, for continuous time control. The plant represents the coupled manipulator and environment, and $\dot{x}_d$ is the desired velocity of the end effector of the manipulator.

Figure 1B:
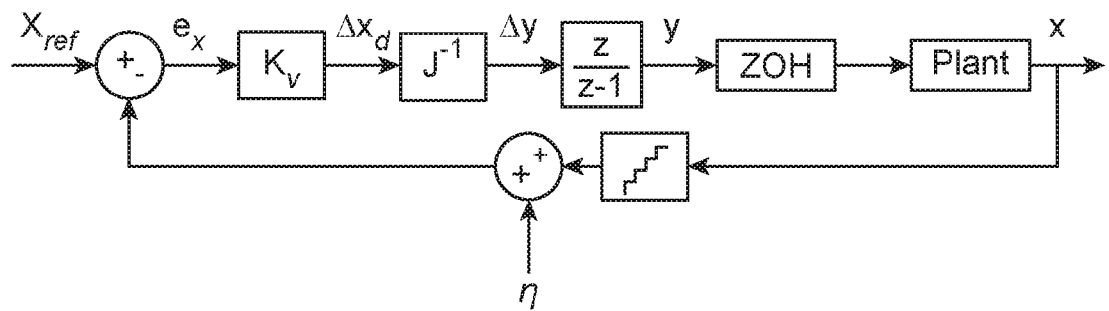
FIG. 1B illustrates digitization of the control loop of FIG. 1A.

FIG. 1B illustrates digitization of the control loop of FIG. 1A, where $\Delta x_d$ is the desired displacement in a unit time step.

Closed-loop control may rely on integration of servo-commands at the actuator level, so that, as noted above, actuator wind-up can occur when the manipulator tip is constrained, and force and torque are increased. On a continuum manipulator, windup occurs when the manipulator is constrained such that displacements at the tip cannot be sufficiently measured within the resolution of the sensor. When stiffness in the environment increases, displacement x decreases to zero, error $e_x$ increases, desired displacement $\Delta x_d$ increases, and, after a time, the closed-loop controller acts as an open-loop controller with a constant error $e_x$.

Thus, the desired actuation Δy is continuously integrated, resulting in wind-up. In addition to the effect of constraints, digitization of the control loop introduces quantization errors and noise, both of which may mask errors. Wind-up instability can be mitigated by saturating the integration or actuation of the manipulator, but at the cost of steady state errors. These steady-state errors can be significant for manipulators operating in constrained environments, and the conformation of the manipulator can result in different levels of interaction forces at saturation; thus, relying on actuator saturation is non-ideal as a primary way to avoid wind-up.

The undesirable effects of meeting constraints can be minimized, and the controllability of the manipulator can be improved, by measuring forces, and controlling the manipulator based on both position and force.

Position/Force Control in a Model-Less Controller:

Model-less control incorporation position/force control according to the present disclosure includes two components: a closed loop controller that solves for actuator displacements; and a Jacobian estimation technique that continuously estimates a local Jacobian mapping while the manipulator is traversing an environment, and updates the Jacobian matrix in the closed-loop control accordingly.

Figure 2:
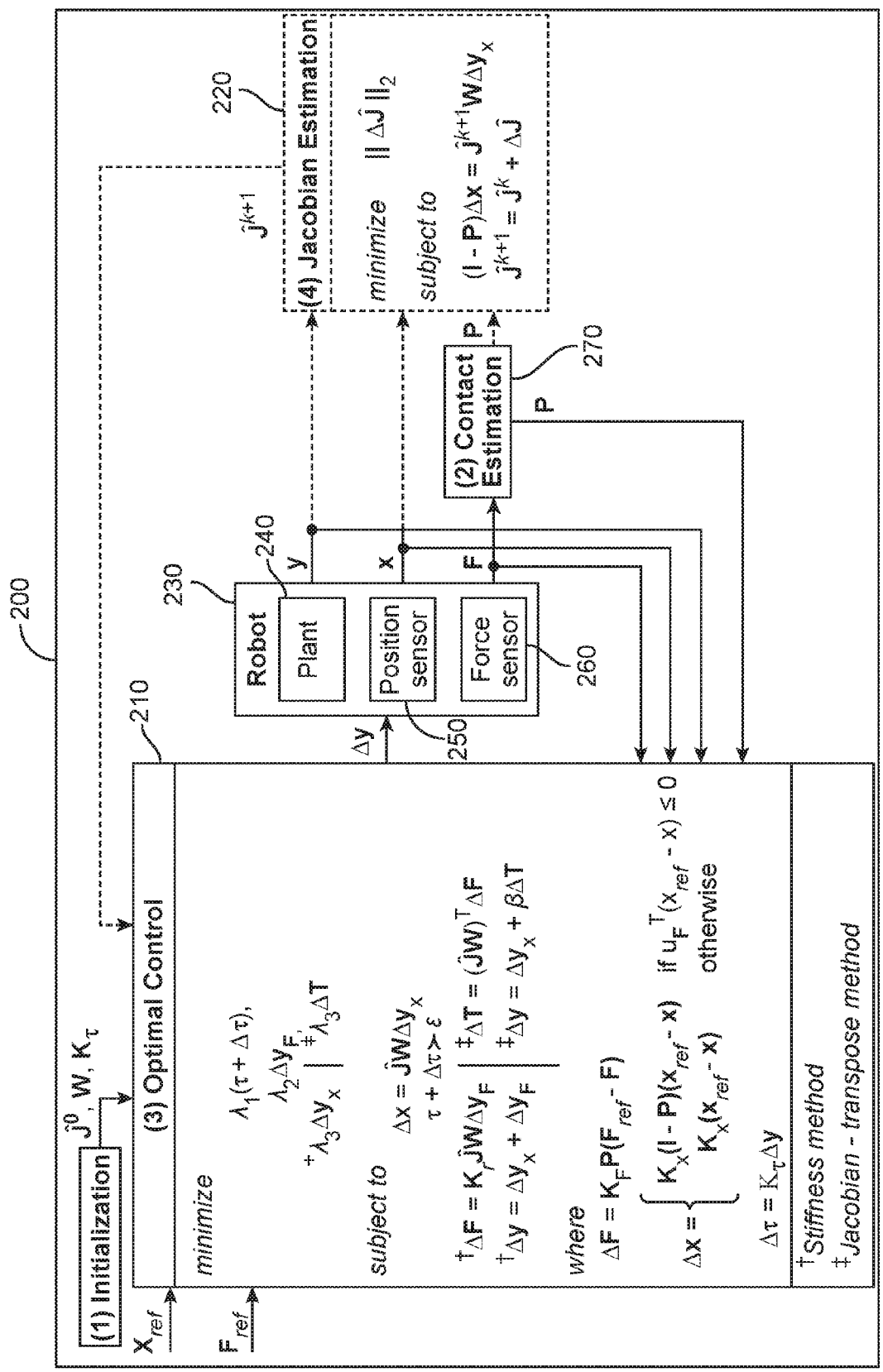
FIG. 2 illustrates a representation of a control system.

FIG. 2 illustrates a representation of a control system 200 according to an embodiment of the present disclosure. Control system 200 includes a controller with model-less closed-loop control 210 and a Jacobian estimator 220 for position/force control. A manipulator 230 ("robot") is controlled by the controller. Portions of, or all of, the controller may be implemented within the manipulator 230. For example, in an embodiment, the manipulator 230 includes a processing device that implements the closed-loop control 210 and the Jacobian estimator 220. In other embodiments, portions of, or all of, the controller is implemented externally to the manipulator 230. For example, in an embodiment, the controller includes a processing device that implements the closed-loop control 210 and the Jacobian estimator 220, and the processing device is physically located externally to the manipulator 230 and is coupled to the manipulator 230 via a wired or wireless connection.

In FIG. 2, solid lines indicate the portion of the controller that controls manipulator 230 position and actuation, while dashed lines show the portion of the controller that implements Jacobian estimation. FIG. 2 illustrates two examples of control techniques in the closed-loop control 210, a stiffness technique and a Jacobian-transpose technique, both of which are described in detail below.

The manipulator 230 includes one or more actuators in a plant 240 (see, e.g., the plant illustrated and described with respect to FIG. 1B), one or more position sensors 250, and one or more force sensors 260.

Actuators, position sensors 250, and force sensors 260 may be located in the end-effector of the manipulator 230, at a tip of the manipulator 230, or elsewhere in or on the manipulator 230. For readability, the following discussion describes an actuator in the end-effector of the manipulator 230, where one position sensor 250 senses position or movement at a position on the end-effector and one force sensor 260 measures force; however, it should be understood that the concepts of the present disclosure encompass controlling multiple actuators, and/or using multiple position sensors 250 and/or multiple force sensors 260. Further for readability, the following discussions describe a digital implementation (e.g., FIG. 1B); however, an analog implementation (FIG. 1A) or a hybrid analog/digital implementation is also within the scope of the present disclosure.

The manipulator 230 receives a desired actuator movement Δy provided by the closed-loop control 210, and the actuator moves by some amount to effect the desired actuator movement Δy. The manipulator 230 moves by some amount due to the actuator movement. The position sensor 250 provides position information to the closed-loop control 210, in terms of measured position x of the end-effector, and/or in terms of measured displacement Δx of the end-effector. (An optional position sensor 250 may provide position information of the actuator, in terms of a measured position y of the actuator, and/or in terms of a measured displacement Δy of the actuator.) Based on the measured position information provided by the position sensor 250, the closed-loop control 210 determines an error $e_x$ (as shown in FIG. 1B), and a new desired actuator movement Δy. The force sensor 260 provides a measured force to the closed-loop control 210, to use in determining the next desired actuator movement Δy.

Meanwhile, as the environment encountered by the manipulator 230 changes, the Jacobian estimator 220 determines updates for the Jacobian matrix in the closed-loop control 210 based in part on information from the position sensor 250 (and optionally on measured position information y of the actuator). A contact estimator 270 in the controller provides a contact value P based on measurements from the force sensor 260, and the contact value P is alternatively or additionally used in the determination of updates to the Jacobian matrix.

Updates to the Jacobian matrix are provided to the closed-loop control 210 during operation of the manipulator 230, to quickly react to the changing environment. Updates may be determined periodically, or may be continuously determined. Alternatively or additionally, updates may be determined at the occurrence of an event, such as when the error $e_x$ crosses a threshold, or a change in force exceeds a set amount, and so forth. Updates may be provided by the Jacobian estimator 220 to the closed-loop control 210 when ready, periodically, or at scheduled times.

The following sections describe the initialization of the model-less controller, and two techniques for closed-loop optimized control of position and forces concurrently. The two closed loop optimized control techniques each add a single user-defined parameter, but remain model-less. The technique is generalized for an m degree of freedom manipulator in n-dimensional space (including redundant or under-actuated systems where min).

Initialization of Closed-Loop Control:

A Jacobian matrix J is constructed by moving each actuator (e.g., each actuator in the plant 240) independently an incremental amount $\Delta y_i$ while measuring a displacement Δx (e.g., a displacement of the actuator, or a displacement of the manipulator 230, measured by the position sensor 250). The ith column of J is constructed as $J_i = \Delta x / \Delta y_i$, as shown in equation (4).

$$J = [J_0 \ldots J_n] \quad (4)$$

A weighting matrix W is constructed to normalize the actuator signals, as shown in equation (5), where $\|\cdot\|_2$ is the vector 2-norm operator.

$$W = \mathrm{diag}(\|J_0\|_2, \ldots, \|J_n\|_2) \quad (5)$$

Then, Δx is derived as shown in equation (6), where $\hat{J} = JW^{-1}$ is the Jacobian matrix estimate with column vectors of unit length.

$$\Delta x = \hat{J} W \Delta y \quad (6)$$

WΔy normalizes and makes dimensionless the actuator signals such that, when solving for actuator displacements using equation (6), desired displacements are not affected or biased by units of measurement or gearing.

In an embodiment, the controller may control a tendon-driven continuum manipulator. Tendon-driven continuum manipulators may be redundantly actuated in order to achieve bi-directional actuation. Co-activation of tendons results in pre-tensions along the tendons and the body of the manipulator, which is a quantity of interest that can be minimized. Tendon tensions can be related to tendon displacements by a linear function, so a diagonal stiffness matrix $K_\tau$ is defined as shown in equation (7), where τ is the tension in the tendons.

$$\Delta \tau = K_\tau \Delta y \quad (7)$$

Columns of $K_\tau$ can be constructed by moving each actuator separately and measuring the change in tensions in all tendons. Tendon tensions τ can be measured using a load cell for each tendon.

Figure 3:
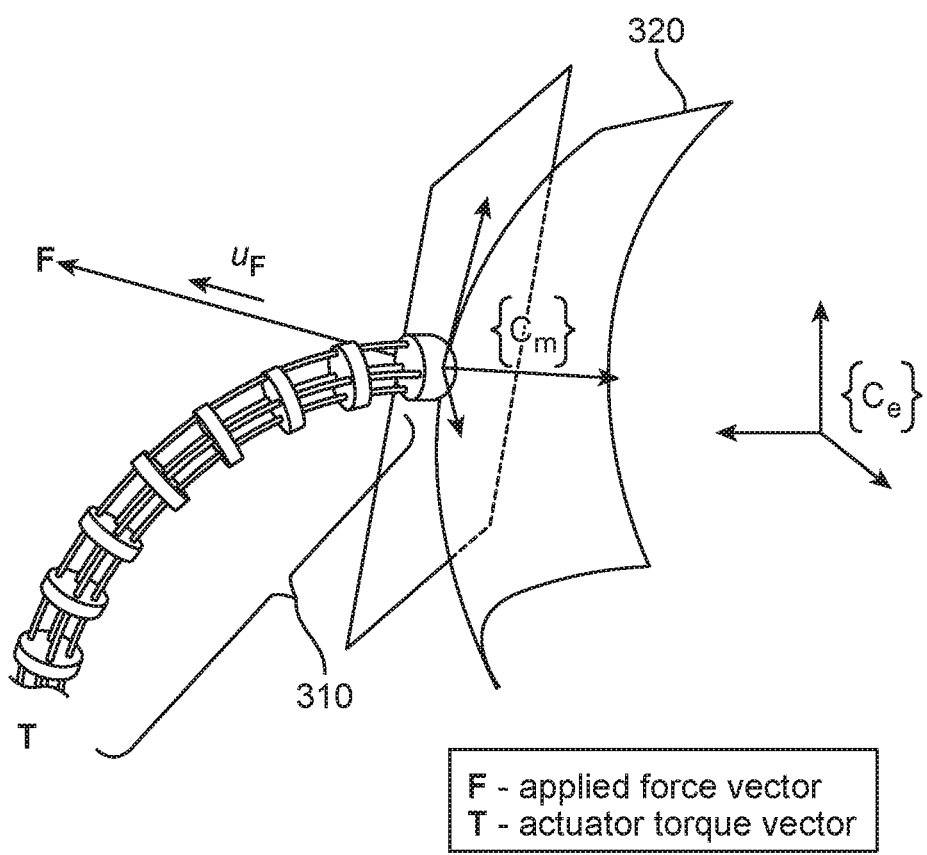
FIG. 3 illustrates contact of a manipulator and a surface.

Contact Estimation:

FIG. 3 illustrates contact of a manipulator 310 and a surface 320. The amount of contact is estimated (e.g., by contact estimator 270) according to an embodiment of the present disclosure as follows. As shown in FIG. 3, a tri-axial force at the manipulator 310 tip is measured in the manipulator 310 frame $\{C_m\}$ (e.g., by force sensor 260). The measured forces are then defined in the environment frame $\{C_e\}$ (the same frame in which the desired reference position and reference forces are described) using the rotation matrix $_m^e R$.

Let $F = {_m^e}RF$ be the forces already defined in the environment frame; the direction of the contact force is then $uF = F/\|F\|_2$ where $\|\cdot\|_2$ is the vector 2-norm operator. Defining contact using uF allows for definition of a projection matrix $P = u_F u_F^T$ that projects a vector into the direction of the surface 320 normal. Similarly, it allows for removal of the components of a vector in the direction of contact through (I-P), where I is the identity matrix.

Under an assumption that the environment can be approximated to be locally planar at the manipulator 310 tip, force along uF is a controlled variable, and displacement in the direction in a plane orthogonal to uF is a controlled variable. Positions in the uF direction are assumed to not be directly controllable; forces in the plane orthogonal are also not controlled and furthermore are assumed to be zero given the assumption of local-planar contact. This will be useful for avoiding trying to regulate forces and positions in the uncontrollable directions. When measured forces fall under a small value $f_{min}$, the controller assumes that the manipulator 310 is no longer in contact with the surface 320. This assumption is made to compensate for the noise and resolution of the force measurements.

Closed-Loop Control:

The closed-loop controller (e.g., as described with respect to FIG. 2) minimizes a combination of objectives given a number of physical constraints. The objectives and constraints that are not dependent on force control are described first, whereas those dependent on a specific technique of force control (whether through a stiffness or Jacobian-transpose technique) are described subsequently.

Closed-loop control in the unconstrained direction is controlled through equation (6), as shown again in equation (8), where $\Delta y_x$ is the actuation responsible for moving a manipulator in the unconstrained direction.

$$\Delta x = \hat{J} W \Delta y_x \quad (8)$$

Let Δx describe a desired displacement in an unconstrained direction. Given a proportional gain closed-loop controller, the desired displacement is described as in equation (9), where $x_{ref}$ is a reference trajectory, x is the measured position, and $K_x$ is proportional gain.

$$\Delta x = \begin{cases} K_x(I-P)(x_{ref}-x) & \text{if } u_F^T \Delta x > 0, \\ K_x(x_{ref}-x) & \text{otherwise} \end{cases} \quad (9)$$

The definition in equation (9) avoids controlling positions when moving into a surface, but allows the user to define positions that move the manipulator off-contact. The control of forces using a proportional gain closed-loop controller is described as in equation (10), where $F_{ref}$ is the reference force, F is the measured force, and $K_F$ is the proportional gain.

$$\Delta F = K_F P(F_{ref}-F) \quad (10)$$

Specifically for a tendon-driven manipulator, the controller should ensure that tendons maintain a positive tension so that they do not go slack. Thus, to maintain a constant positive tension, the constraint of equation (11) is included, where $\Delta\tau$ is from equation (7).

$$\tau+\Delta\tau \geq \epsilon \quad (11)$$

Thus, for either of the following position/force control techniques, two objectives that are to be minimized are $\Delta y_x$ and $\Delta\tau$, and the position equation (8) and tendon tension constraints in equation (11) are to be satisfied.

Figure 4:
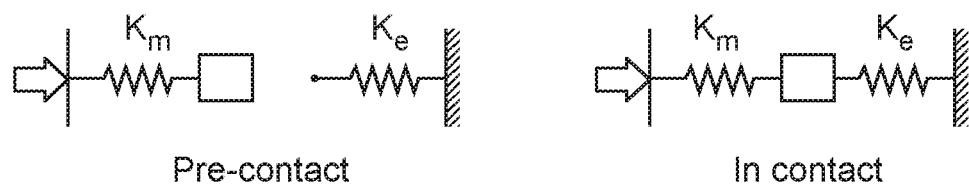
FIG. 4 illustrates pre-contact and in-contact spring representations of a continuum manipulator.

Stiffness Technique:

One technique to describe force constraints is to approximate the continuum manipulator's backbone as a spring and to approximate the environment as having a certain stiffness, such that when the manipulator and environment come into contact with each other, they act as a series-elastic system. For the series-elastic system, when the manipulator is in contact with the environment, the difference between the manipulator's measured position x and its position x' if it were not constrained represents the compression of the manipulator, which creates a spring force $F_m$; similarly, the difference between x and the unconstrained contact location $x_0$ of the environment is the environment stiffness $F_e$. (See the pre-contact and in-contact spring representations in FIG. 4.) The spring force $F_m$ and environment stiffness $F_e$ are described in equations (12), where $K_m$ and $K_e$ are manipulator stiffness and environmental stiffness matrices, respectively, and each are non-negative and symmetric.

$$F_m = K_m(x-x')$$

$$F_e = k_e(x-x_0) \quad (12)$$

The series-elastic system results in a relationship between force and displacement as shown in equation (13), where $K_r = K_e K_m (K_e + K_m)^{-1}$ is a resultant stiffness mapping between the actuated displacement and the output force of the manipulator, and is non-negative and symmetric.

$$\Delta F_m = -\Delta F_e = K_r \Delta x \quad (13)$$

Then, from equations (8) and (13), a desired change in force $\Delta F$ is described by equation (14), where $\Delta y_F$ is the actuation responsible for applying forces in the direction of contact.

$$\Delta F = K_r \hat{J} W \Delta y_F \quad (14)$$

A full closed-loop optimal controller using the stiffness technique is described in equation (15).

$$\underset{\Delta y}{\text{minimize}} \sum_{i=1}^{3} \lambda_i \|h_i\|_2 \quad (15)$$

$$h_i = \begin{cases} h_1 = \tau + \Delta\tau \\ h_2 = \Delta y_F \\ h_3 = \Delta y_x \end{cases}$$

subject to $$\Delta x = \hat{J} W \Delta y_x$$

$$\Delta F = K_r \hat{J} W \Delta y_F$$

$$\tau + \Delta\tau \geq \epsilon$$

$$\Delta y = \Delta y_x + \Delta y_F$$

The L2-norm of the objective functions $\|h_i\|_2$, i=1 . . . 3, is used to find the pareto-optimal least-squares solution of actuator displacements that (i) minimizes tendon tensions, (ii) minimizes actuation for controlling applied forces, and (iii) minimizes actuation for following a trajectory. $\Delta y_x$ and $\Delta y_F$ are explicitly minimized as they independently control positioning and force-reflecting actuations. Although the position and force constraints are orthogonal, the solution spaces for $\Delta y_x$, $\Delta y_F$ are not orthogonal. Thus, if minimizing the sum, $\Delta_y$, independent control of position and force actuations would be lost, and the optimization routine would find a min-norm solution of the sum, resulting in unknown weighting on the force and position tracking actuations. Therefore, $\Delta y_x$ and $\Delta y_F$ are independently minimized. Additionally, $\tau+\Delta\tau$ is explicitly minimized to account for the r≤m tendon actuators in the system.

In review, stiffness-based closed-loop optimal control is model-less control where there is an extra user-defined term $K_r$ that provides a mapping from displacement to force.

Jacobian-Transpose Technique:

A second technique for determining actuations to exert desired forces uses a Jacobian-transpose (J-transpose) technique. The power in a continuum manipulator can be defined as in equation (16), where T is actuator torque and $\nabla V$ is change in energy that is not transferred to output force (including energy losses and potential energy, such as due to dissipative, elastic, and gravitational sources).

$$T^T \dot{y} = F^T \dot{x} + \nabla V(x, \dot{x}, y, \dot{y}) \quad (16)$$

Here, an approximation is that, when the manipulator is in contact with the environment, it is presumed that most of the energy resulting from small increments of actuator torque are transferred from the actuator to the environment as forces, as shown in equation (17).

$$\Delta T^T \dot{y} \approx \Delta F^T \dot{x} \quad (17)$$

It is shown below that, even with this assumption, the J-transpose technique is effective in force control. Equation (18) allows for adjusting output forces in the constraint direction by controlling $\Delta T$ through the J-transpose mapping of equation (19).

$$\Delta T^T \dot{y} = \Delta F^T J W \dot{y} \quad (18)$$

$$\Delta T = (\hat{J} W)^T \Delta F \quad (19)$$

The closed-loop controller for a tendon-driven manipulator using the J-transpose technique is as shown in equation (20), where β is an approximate gain that converts actuator torque to actuator displacement, and is empirically set.

$$\underset{\Delta y}{\text{minimize}} \sum_{i=1}^{3} \lambda_i \|h_i\|_2 \quad (20)$$

$$h_i = \begin{cases} h_1 = \tau + \Delta\tau \\ h_2 = \Delta T \\ h_3 = \Delta y_x \end{cases}$$

subject to $$\Delta x = \hat{J} W \Delta y_x$$

$$\Delta T = (\hat{J} W)^T \Delta F$$

$$\tau + \Delta\tau \succeq \epsilon$$

$$\Delta y = \Delta y_x + \beta \Delta T$$

In review, the Jacobian transpose-based closed-loop optimal control is model-less control where there is an extra user-defined term β to approximately convert torque to actuator displacement.

Jacobian Estimation:

Unconstrained model-less control utilizes constrained optimization to estimate the manipulator Jacobian mapping given measured input actuations and output displacements. For end-effector constrained motions, the local-linear Jacobian mapping is estimated by solving equation (21).

$$\underset{\hat{J}^{k+1}}{\text{minimize}} \|\Delta\hat{J}\|_2 \quad (21)$$

subject to $(I - P)\Delta x = \hat{J}^{k+1} W \Delta y_x$ $$\hat{J}^{k+1} = \hat{J}^k + \Delta\hat{J}$$

$\Delta x$ is the measured end-effector displacement, which can include motions caused by both position and force control, and thus, $(I-P)\Delta x$ is the portion of the measured displacement parallel to the contact surface. $\Delta y_x$ is the actuation for controlling position in the unconstrained direction. Therefore, the Jacobian mapping is estimated based on the unconstrained directions, and constrained motion effects due to the environment are prevented from influencing the estimate of the Jacobian mapping. The resulting effect is a Jacobian mapping estimate with the components in the constrained direction that lag behind; these lagging components become updated as the contact direction changes or the manipulator comes out of contact. One example is when the environment stiffness is stiff ($K_e \to \infty$) and the manipulator moves into the environment, which results in a poorly constrained equation, $0 \approx \hat{J}^{k+1} W \Delta y$ in the direction of contact.

When the manipulator is unconstrained, the closed-loop controller and the model-less Jacobian estimation simplifies. The closed-loop controller is described as in equation (22), whereas the model-less Jacobian estimation is as in equation (23).

$$\underset{\Delta y}{\text{minimize}} \|\tau + \Delta\tau\|_2 + \lambda\|\Delta y\|_2 \quad (22)$$

subject to $\Delta x = \hat{J} W \Delta y$ $$\tau + \Delta\tau \succeq \epsilon$$

$$\Delta\tau = K_r \Delta y$$

$$\underset{\hat{J}^{k+1}}{\text{minimize}} \|\Delta\hat{J}\|_2 \quad (23)$$

subject to $\Delta x = \hat{J}^{k+1} W \Delta y$ $$\hat{J}^{k+1} = \hat{J}^k + \Delta\hat{J}$$

The manipulator is considered unconstrained in practice when the force sensor measures below a small threshold near sensor noise levels, set empirically by the operator.

Experiments

Figure 5:
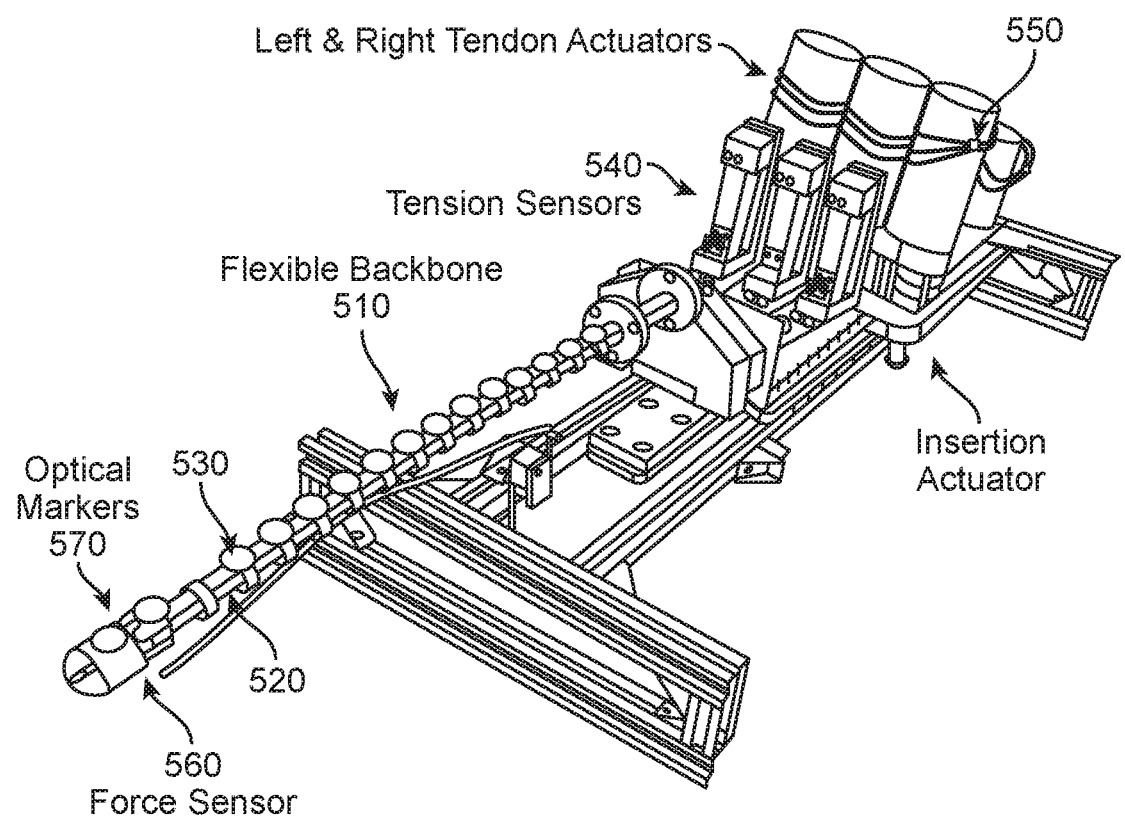
FIG. 5 illustrates an implementation of a tendon-driven continuum manipulator including a model-less position/force controller.

FIG. 5 illustrates an implementation of a tendon-driven continuum manipulator including a model-less position/force controller according to an embodiment of the present disclosure. The continuum manipulator included an antagonistic tendon drive and an insertion actuator. Distal force sensing was achieved by a distal force sensor, and tendon tensions were measured using load cells. An overhead camera (not shown) provided two-dimensional tracking in the workspace. Experiments were performed using both of the example techniques (stiffness and J-transpose) for model-less control.

The tendon-driven continuum manipulator included a flexible backbone 510 (length of about 280 millimeters (mm), cross-section of about 0.8 mm×12 mm, 37 megapascals (MPa) capability, from McMaster Carr) and two 0.6 mm diameter steel wire tendons 520. Three-dimensional printed plates 530 placed evenly over the length of the backbone acted as vertebrae and provided a guide for the tendons to pass through. Tension sensors 540 (LSP-5, range 0-5 kilograms (kg), from Transducer Techniques) measured cable tensions during tendon actuation, and an insertion motor 550 drove the manipulator forwards and backwards. Force at the manipulator tip was measured with a six-axis force sensor 560 (Nano17, from ATI Industrial Automation) with a 3 millinewton (mN) resolution. A single, uncalibrated camera (Playstation Eye, 480×640 pixels, from Sony Entertainment Corporation, not shown) was placed 50 centimeters (cm) above the environment and facing downwards, providing position tracking at 50 Hertz (Hz) at a resolution of approximately 0.5 mm per pixel. The position of two optical markers 570 provided position and orientation at the tip, and tracking was performed using color thresholding on the markers and corner detection.

To minimize the effects of digitization (e.g., see FIG. 1B), Jacobian estimation was run when the manipulator had moved more than 8 pixels or 4 mm. Additionally, a moving average of $\hat{J}^{k+1} = \hat{J}^k + \alpha\Delta\hat{J}$, $\alpha=0.5$, was applied to the Jacobian estimate for noise filtering. The controller gains were tuned to achieve a damped response and stable forces. For the J-transpose controller, the force control tuning parameter was empirically set to β=1, achieving damped responses in the force control. For both force control techniques (stiffness and J-transpose), a minimum tendon tension of τ=0.3 Newtons (N) was maintained using the constrained optimization technique during each control cycle.

A manipulator was considered unconstrained when the force sensor measurements fell below $f_{min}=20$ mN. For stiffness-based closed-loop optimal control, the manipulator stiffness was approximated with a diagonal stiffness map with axial stiffness $K_a$, and bending stiffness $K_b$, such that $K_r = K_e K_m (K_e + K_m)^{-1}$, and $K_m = {}_m^e R \text{diag}(K_a, K_b, K_b)_m^e R^T$. Axial stiffness was set to 0.1 N/mm and a bending stiffness to 0.01 N/mm in the stiffness-based controller to account for the anisotropic stiffness of the continuum manipulator. The closed-loop control and the Jacobian estimation optimizations were performed using a CVXgen convex optimization solver. The optimizations in equations (15), (20) and (21) were described as linear programs (LP), a special form of a convex optimization problem that converges to the global optimal solution quickly and efficiently. The solver took approximately 10 microseconds (usec) to solve for each optimization problem, well below low-level feedback control rates on the actuators.

Figure 6:
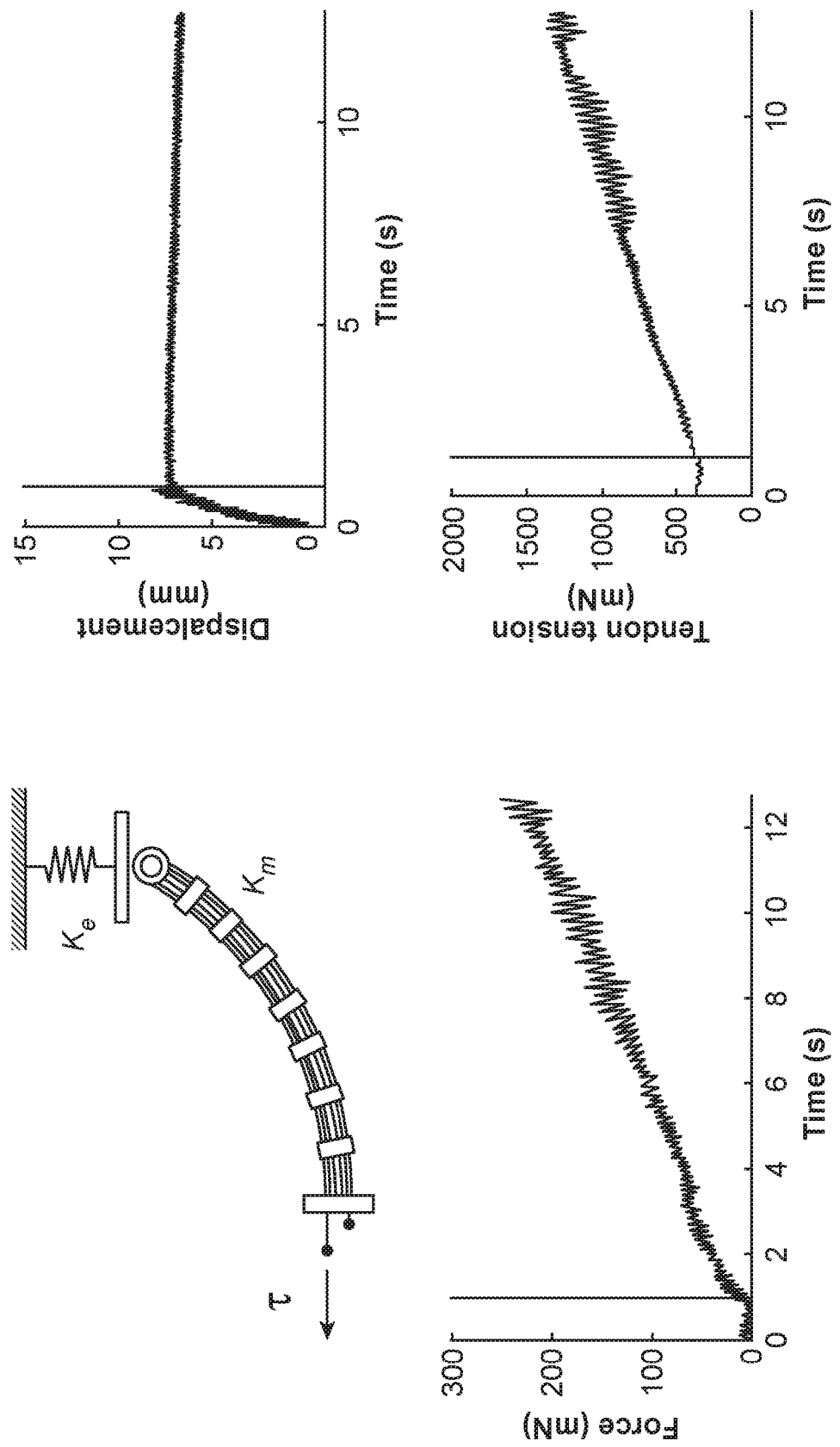
FIG. 6 illustrates an effect of contact between a continuum manipulator and its environment, using model-less closed loop control in a physical setup.

Experimental Results:

FIG. 6 illustrates an effect of contact between the continuum manipulator and its environment, using model-less closed loop control in a physical setup. Although model-less control is able to converge to the desired tip position, actuator windup is evident as the controller attempts to adjust the Jacobian matrix to account for higher apparent stiffness of the continuum manipulator. This serves to push the solution to converge faster, but in turn continues to drive the actuator windup. Actuator wind-up leads to manipulator buckling and stiffening. Darker areas on each plot in FIG. 6 indicate times during which the manipulator was in contact with the environment.

Figure 7A:
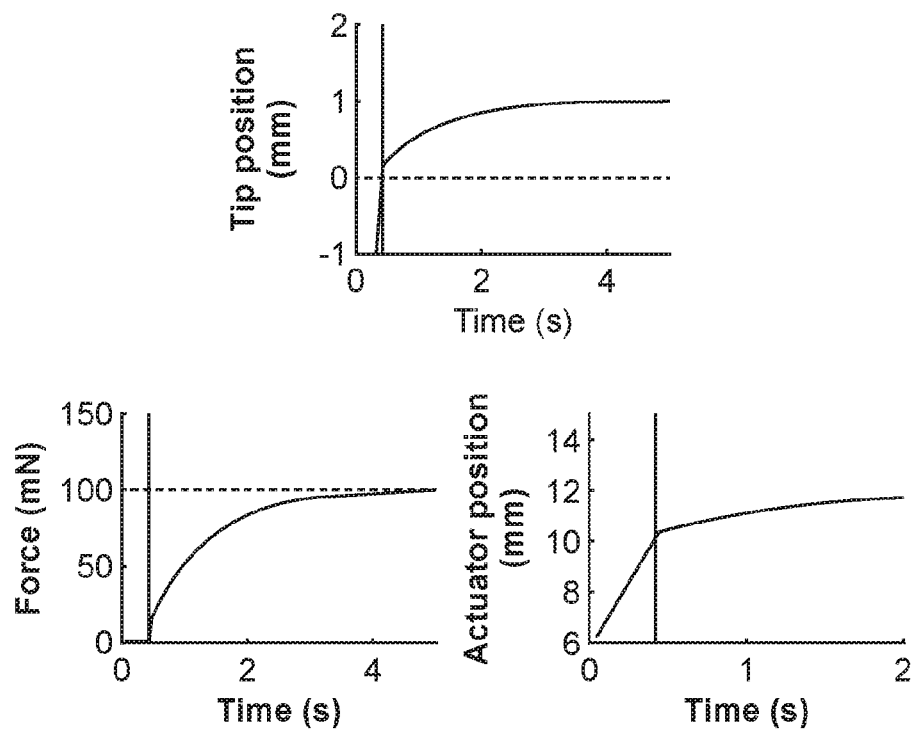
FIG. 7A illustrates that adding force control to the model-less control allows for control of position and control of forces exerted on the environment.

FIG. 7A illustrates that adding force control to the model-less control allows for control of position and control of forces exerted on the environment. Results are shown for $K_r=0.5$. As indicated, the controller was successful in controlling position, while controlling force at 0.1 N, and avoiding actuator wind-up instability when the manipulator was in contact with the environment. Darker areas on each plot in FIG. 7A indicate times during which the manipulator was in contact with the environment.

Figure 7B:
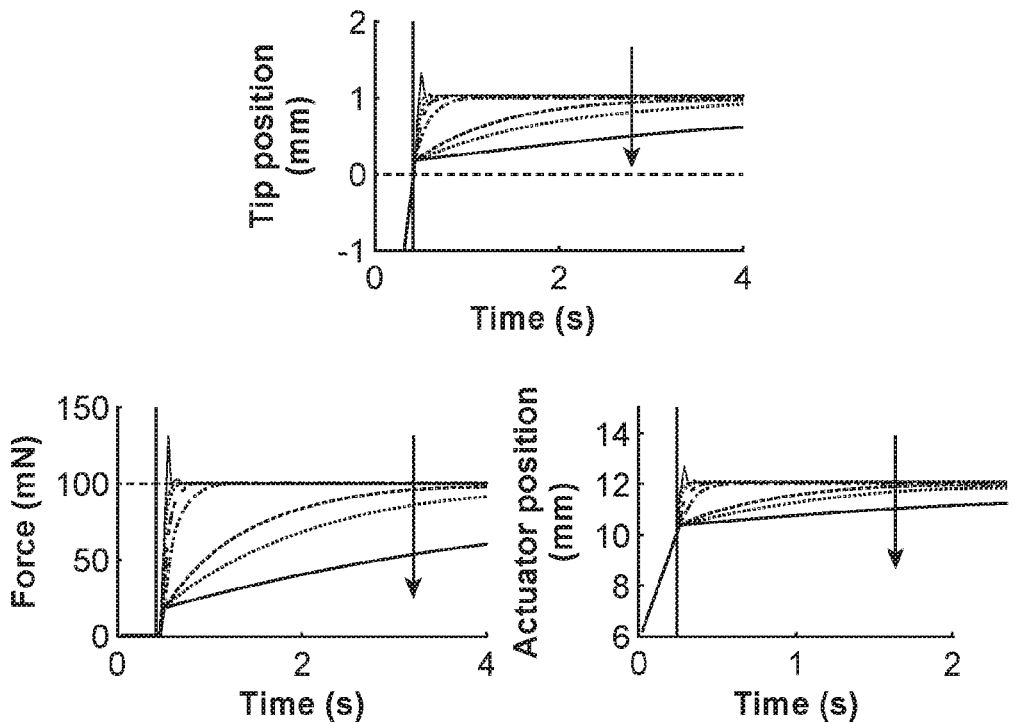
FIG. 7B illustrates an effect of error in estimating $K_r$ for stiffness-based model-less position/force control.

FIG. 7B illustrates an effect of error in estimating $K_r$ for stiffness-based model-less position/force control. Darker areas on each plot in FIG. 7B indicate times during which the manipulator was in contact with the environment. The plots in FIG. 7B illustrate results for $K_r=0.002, 0.003, 0.004, 0.005, 0.009, 0.050, 0.083$ and $0.250$, where the arrows on each plot indicate increasing values of $K_r$. For stiffness-based control, the controller can provide stable, non-oscillatory control of position and forces even when the estimated resultant stiffness is an order of magnitude away from the true stiffness of the environment and manipulator; the technique is therefore robust to variations or estimation errors in stiffness.

When closed-loop proportional gain is $K_F=0.1$, oscillatory motion occurs when $K_r=K_m K_e/(K_m+K_e)$ is underestimated by nearly two orders of magnitude, or when $K_r$ is estimated at a value 50 times softer than the actual environment. Otherwise, the manipulator provides an overdamped, smooth response and can control forces in a stable manner. Further, by modifying $K_F$, the controller can be tuned to be more conservative or more aggressive in its approach to controlling manipulator forces.

Figure 8A:
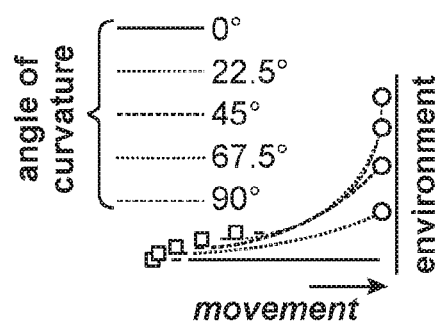
FIGS. 8A and 8B illustrate representations of a manipulator and its environment, at angles of curvature at contact between zero degrees (0°) and 180° (FIG. 8A illustrates angles of 0°-90°, and FIG. 8B illustrates angles of 90°-180°).
Figure 8B:
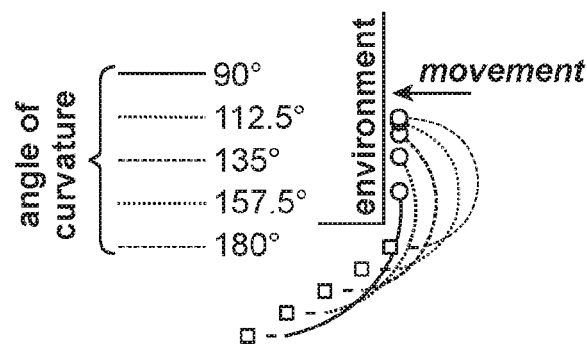
Figure 8C:
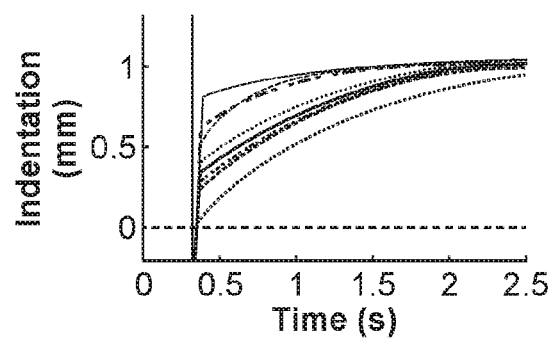
FIG. 8C provides plots of indentation and force at the angles illustrated in FIGS. 8A and 8B.
Figure 8C:
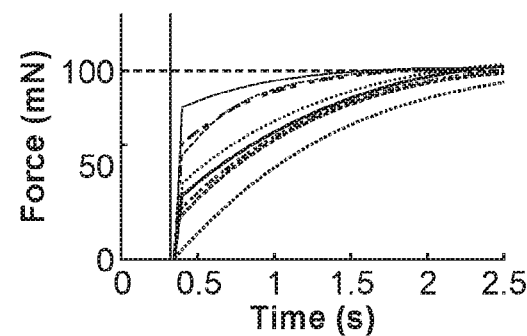

FIGS. 8A and 8B are representations of a manipulator and its environment, illustrating angles of curvature at contact between zero degrees (0°) and 180° (FIG. 8A illustrates angles of 0°-90°, and FIG. 8B illustrates angles of 90°-180°). The manipulator had an axial stiffness of about 1.0 N/mm and a bending stiffness of about 0.1 N/mm, relating to the anisotropy between axial and bending stiffness, with backbone bending mechanics undergoing linear-elastic bending. Under different curvatures, the manipulator was directed to enter into contact with a stiff environment of about $K_e=0.1$ N/mm and maintain contact. The controller was able to maintain constant and stable contact with the environment for each of the angles of curvature, as shown in FIG. 8C, which shows plots of indentation or force at each of the angles. Darker areas on each plot in FIG. 8C indicate times during which the manipulator was in contact with the environment.

Figure 9A:
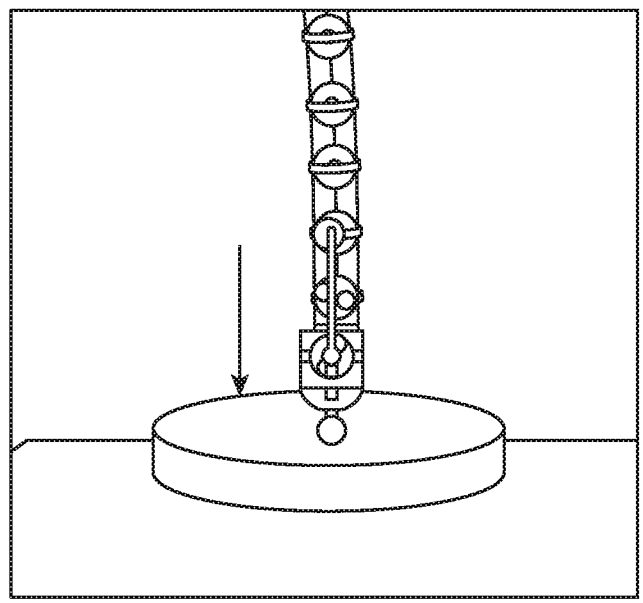
FIG. 9A illustrates a manipulator interacting with the environment along its axial direction.
Figure 9B:
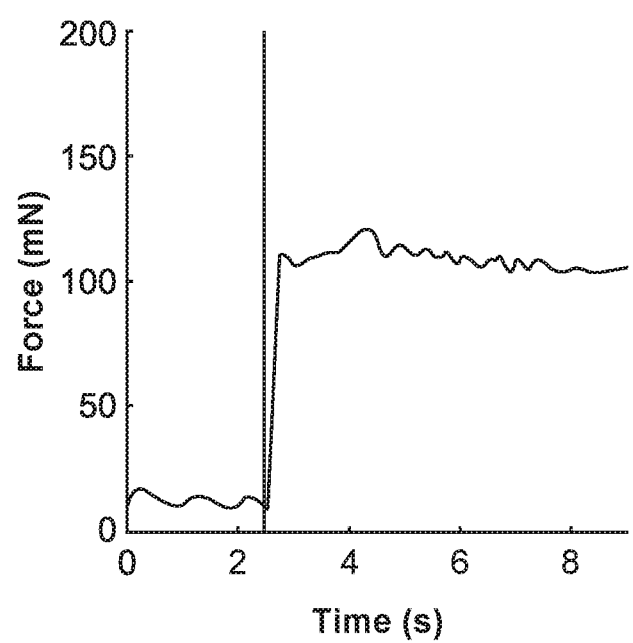
FIG. 9B plots force measured during the interaction illustrated in FIG. 9A.
Figure 9C:
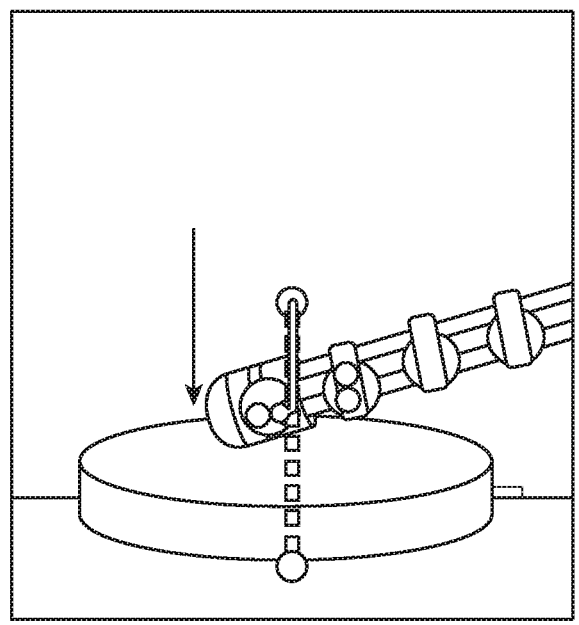
FIG. 9C illustrates the manipulator interacting with the environment in a transverse direction.
Figure 9D:
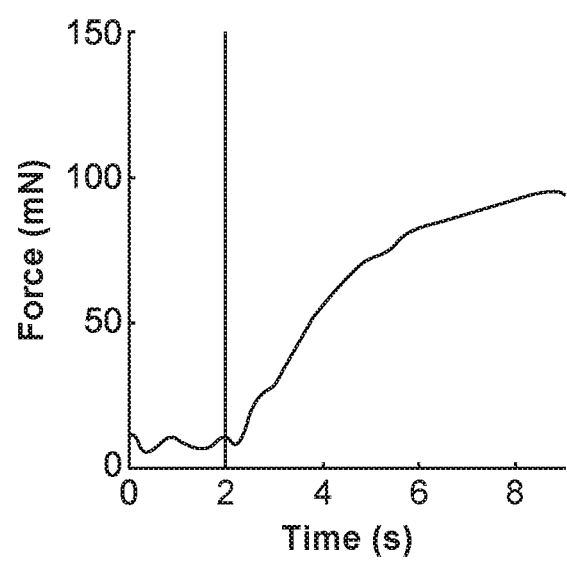
FIG. 9D plots force measured during the interaction illustrated in FIG. 9C.
Figure 9E:
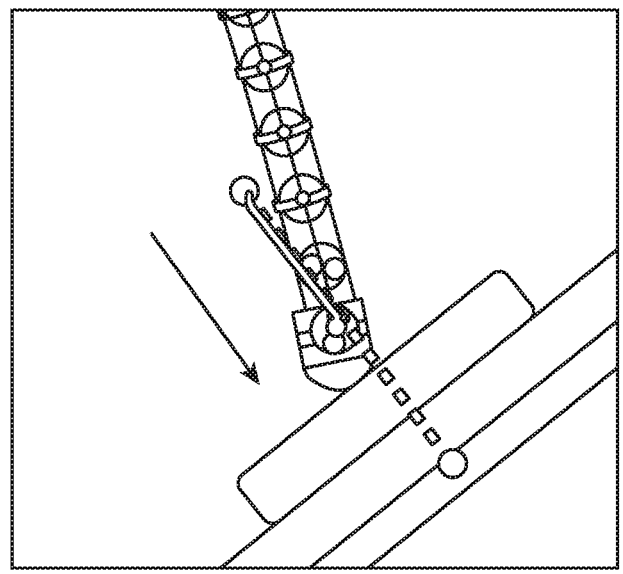
FIG. 9E illustrates the manipulator interacting with the environment in a diagonal direction.

Physical Experiments of Position/Force Regulation in Canonical Contact Scenarios FIGS. 9A-9F illustrate a physical continuum manipulator system in an environment. Darker areas on the plots in FIGS. 9B, 9D, 9F indicate times during which the manipulator was in contact with the environment. A position trajectory was tracked while controlling desired interaction forces for different contact scenarios. The continuum manipulator began in free space, and followed a trajectory that introduced its end-effector into an environmental constraint. The controller was instructed to maintain 100 mN of force when in contact with the environment. FIG. 9A illustrates the manipulator interacting with the environment along its axial direction. Measured force is plotted in FIG. 9B. FIG. 9C illustrates the manipulator interacting with the environment in a transverse direction. Measured force is plotted in FIG. 9D. FIG. 9E illustrates the manipulator interacting with the environment in a diagonal direction. Measured force is plotted in FIG. 9F.

Figure 9F:
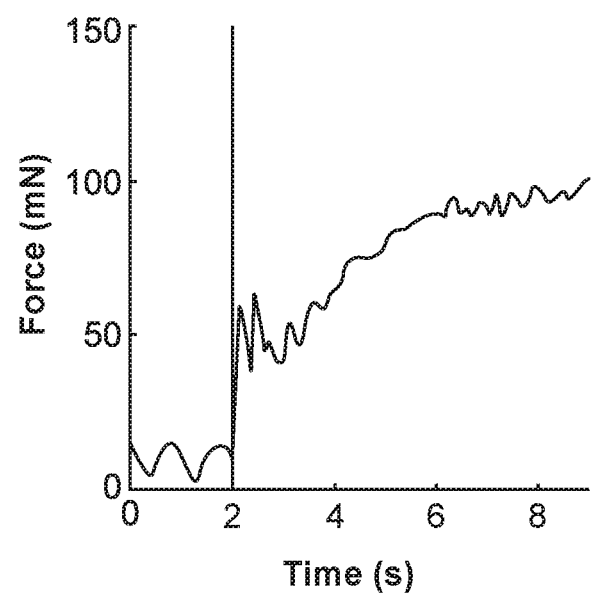
FIG. 9F plots force measured during the interaction illustrated in FIG. 9D.

As shown in FIGS. 9B, 9D, 9F, the transition from freespace to a constrained configuration is shown to be stable. Forces converge to the desired level without any notable oscillatory behavior. At contact, the Jacobian matrix is selectively adjusted and successfully avoids actuator wind-up caused by a contact singularity. Differences in the speed of convergence to the desired forces can be attributed to differences in axial and bending stiffnesses of the manipulator.

Figure 10A:
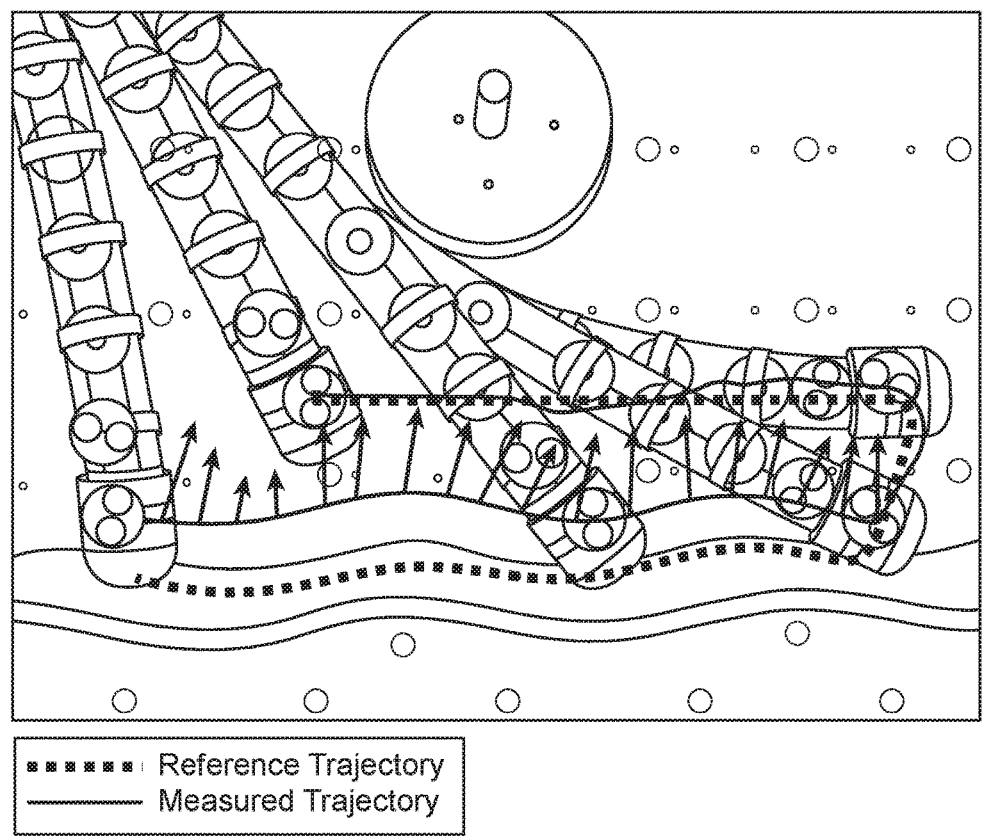
FIG. 10A shows the trajectory of a manipulator across a surface, and the interaction forces between the manipulator and the environment.
Figure 10B:
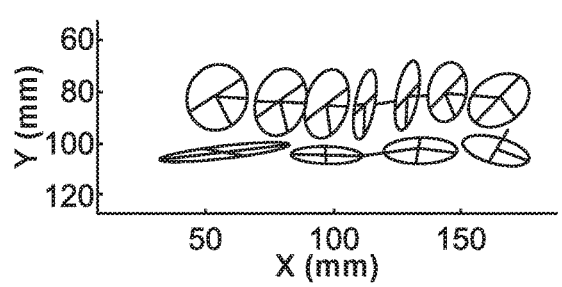
FIG. 10B illustrates the model-less Jacobian of the manipulator as an ellipse at each of multiple locations along the trajectory of FIG. 10A.
Figure 10C:
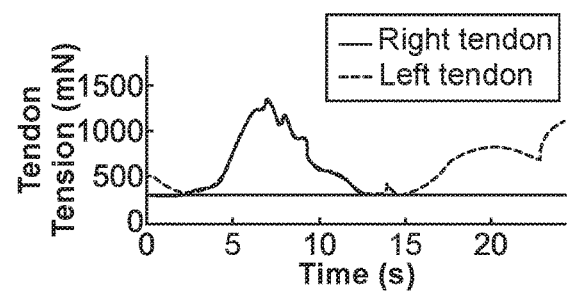
FIG. 10C shows that tendon tensions are minimized while remaining taut during movement along the trajectory of FIG. 10A.

FIGS. 10A-10C demonstrate the continuum manipulator moving through a series of constraints on a wavy surface, resulting in complex contact scenarios and unpredictable conformations. The trajectory of the continuum manipulator moves the manipulator into a body-constraint followed by a tip-constraint; the manipulator is then instructed to maintain a constant force (in this case, 80 mN) along a wall that has fluctuating surface normals and depth.

FIG. 10A shows the trajectory of the manipulator across the surface, and the interaction forces between the manipulator and the environment. The controlled forces are shown as arrows. The manipulator maintained the desired force throughout.

FIG. 10B illustrates the model-less Jacobian of the manipulator as an ellipse at each of multiple locations along the trajectory.

FIG. 10C shows that tendon tensions are minimized while remaining taut.

The model-less controller allowed the manipulator to operate even with unknown body and tip constraints. The force controller was able to maintain the 80 mN force with the environment while tracing the non-linear surface under multiple constraints. This demonstrates the flexibility of the force-controlled model-less control, and its ability to adapt to the environment in a stable manner.

One promising medical application for continuum manipulators is for controlling cardiac ablation catheters. In order to perform a proper ablation, the catheter should apply sufficient pressure at its tip to the tissue in order to achieve cell necrosis, usually through high-intensity radio-frequency energy. Furthermore, contiguous linear ablations are desired to segregate healthy tissues from erroneous and arrhythmia-inducing electrical signals. Control of these contiguous paths and forces are most effectively done in task-space and therefore it is a good environment for applying the proposed model-less position/force controller.

Figure 11A:
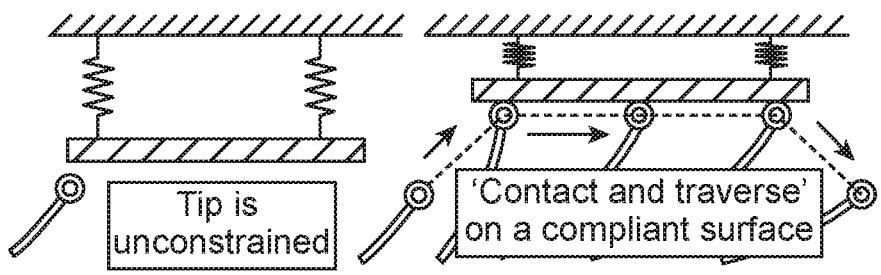
FIG. 11A is a representation of a continuum manipulator applying pressure and tracing a linear path on a silicone tissue phantom.
Figure 11B:
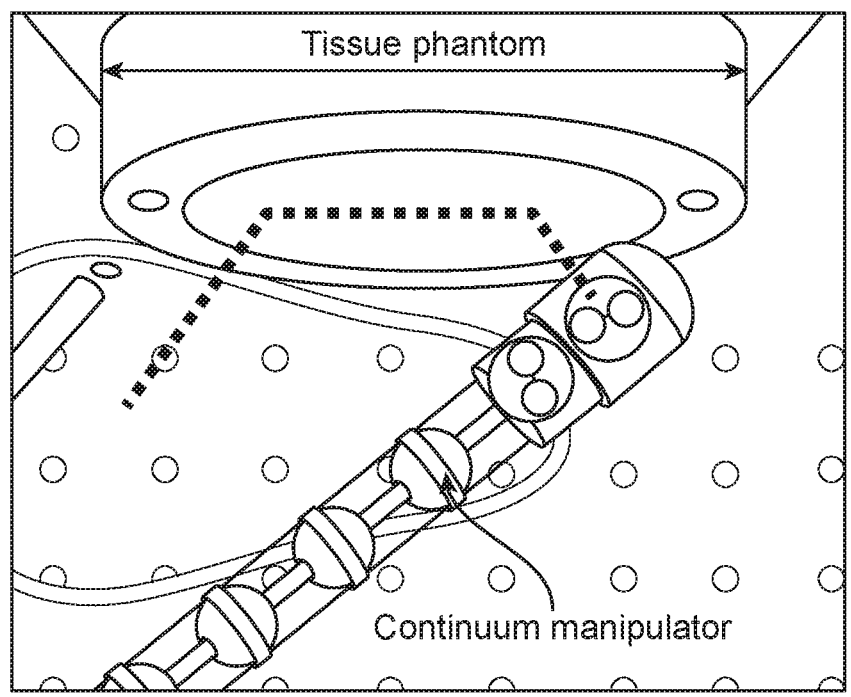
FIG. 11B is an image of a manipulator and a tissue phantom corresponding to the representation of FIG. 11A.

FIG. 11A is a representation of the continuum manipulator applying pressure and tracing a linear path on a silicone tissue phantom. FIG. 11B is an image of the manipulator and the tissue phantom. The tissue phantom has an elastic stiffness of about 0.32 MPa, emulating the stiffness of a diseased human heart.

Figure 11C:
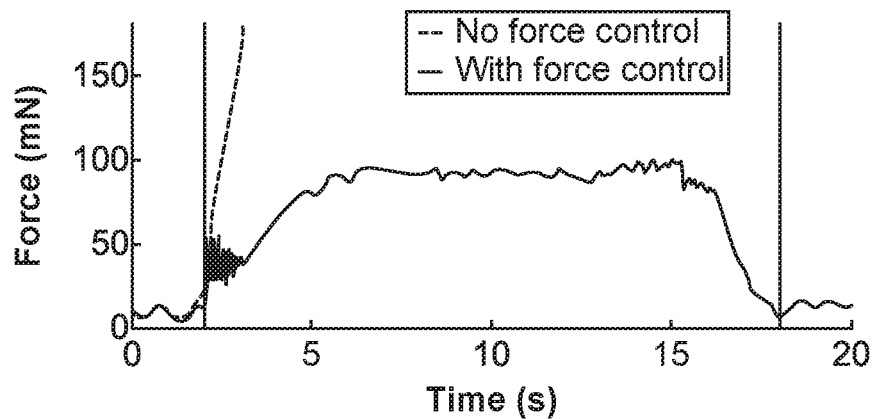
FIG. 11C shows interaction forces for the trajectory of FIG. 11A, both with and without force control.

FIG. 11C shows interaction forces for the given trajectory, both with and without force control. The darker area on the plot in FIG. 11C indicates times during which the manipulator was in contact with the environment. For the model-less control without force control, force saturation is evident. In contrast, the controller with force control regulated forces to maintain constant contact and follow the trajectory while minimizing tendon tensions.

The model-less control was able to trace a user-defined trajectory while applying pressure to the environment. The indentation of the tissue and the compliance of the manipulator dictate the forces applied to the environment, and this is also reflected in the tendon tensions. Forces within the soft tissue phantom were kept relatively constant at about 50 mN. The compliance of the tissue environment and the compliance of the manipulator furthermore serve to keep interaction forces to a safe level.

Thus has been described a controller with model-less control and position/force control, useful for continuum manipulators that are interacting with unknown environments, providing a stable and effective means for controlling interactions with complex and unknown constraints. The controller overcomes artificial workspace singularities and constraints, and avoids unstable behavior that can occur with model-based techniques. The model-less controller's ability to navigate complex environments was shown, where multiple constraints on the body and the manipulator tip occurred, and also where there were transitions between free space motion and constrained motion. By using the model-less position/force controller, the variety of environments that continuum manipulators can operate in is increased, while keeping the controller complexity low.

In the experiments described, co-activation was kept constant and with minimal tension on one of the antagonistic tendons. If internal loading such as co-activation of tendons is variably adjusted (e.g., applying varying axial stress through co-activation), this will also result in $K_m$ varying. Therefore, if axial stiffness is being controlled and varied using co-activation, then $K_m$ will vary based on a linear combination of the tendon tensions. The two closed-loop control techniques presented (stiffness and J-transpose) both utilize approximated mappings to control interaction forces. Another technique according to an embodiment of the present disclosure is to use continuous online estimation of stiffness and/or unaccounted losses in the force-torque mapping. This would, in some respects, make the controller more agnostic to the manipulator and the environment in which it operates, and reduce the amount of tuning by a user to achieve force control.

The techniques of this disclosure are applicable to any continuum manipulator, including devices such as catheters, needles, and concentric tube robotics; and further are applicable to hyper-redundant robots and hybrids, and generally robotic manipulators including robotic arms. Examples of applications include medical robotics, search and rescue, bomb diffusing, geology or mining surveying, micro-assembly, and animatronics, to name a few. As noted above, the use of force control in medical application manipulators provides for ablation of tissue, and additionally provides for palpation, such as for diagnostically estimating tissue stiffness to distinguish vessels or neoplasm, or for therapeutic reasons. One example of use of a medical continuum manipulator according to embodiments of the present disclosure relates to ablation to treat atrial fibrillation, where model-less control with position/force control is used to automate catheter motion, and control ablation forces to the tissue.

As illustrated and described above, embodiments of the continuum manipulator may be in the form of a tendon-driven arm; however, such embodiments are provided by way of illustration and are not limiting. A generalized description of a continuum manipulator is next provided.

Figure 12:
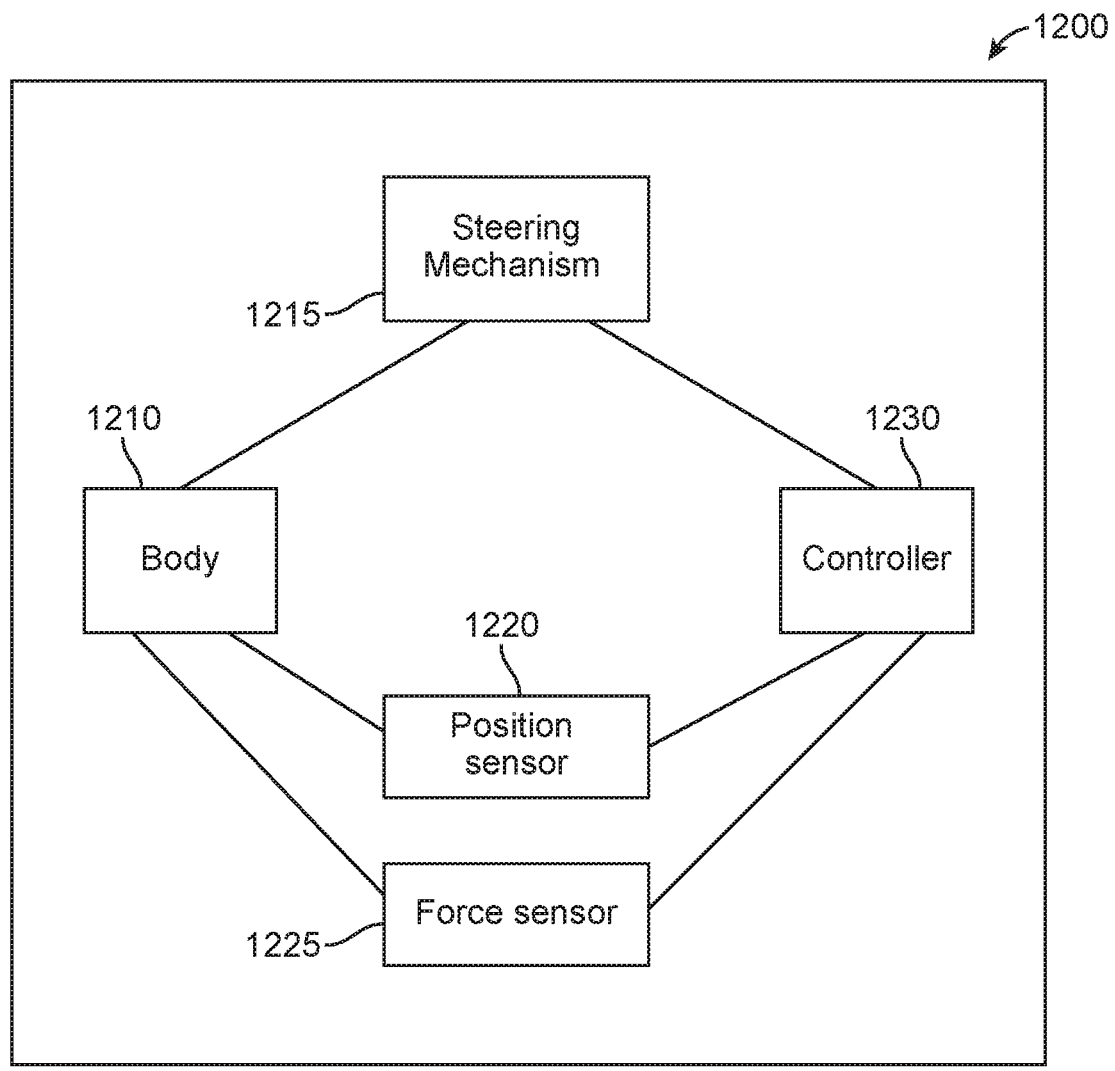
FIG. 12 is a block diagram of a continuum manipulator.

FIG. 12 is a block diagram of an example of a continuum manipulator 1200 according to an embodiment of the present disclosure. The continuum manipulator 1200 includes a body 1210 and a steering mechanism 1215 to steer the body 1210. One or more position sensors 1220 detect a position of the body 1210, and one or more force sensors 1225 detect a force against the body 1210. A controller 1230 includes closed-loop control based on a control matrix. The controller 1230 receives position information from the position sensor(s) 1220 and force information from the force sensor(s) 1225, and provides control commands to the steering mechanism 1215 based on the position information and the force information. The controller 1230 updates the control matrix based on the position information and on the provided control commands.

The body 1210 may be a tendon-driven arm, such as illustrated in FIG. 10A. In other embodiments, the body 1210 may be designed according to the environment in which it will be used. For example, one can envision that the body 1210 of a continuum manipulator 1200 used for bomb disposal may be designed quite differently from the body 1210 of a continuum manipulator 1200 used for in vivo ablation. In one or more embodiments, the body 1210 is waterproof or resistant to fluids. In one or more embodiments, the body 1210 is resistant to damage from impact. In one or more embodiments, the body 1210 is resistant to damage from temperature changes or temperature cycling.

The steering mechanism 1215 illustrated in the example of FIG. 5 includes tendons, and actuators to control the tendons. In other embodiments, the steering mechanism 1215 includes actuators that control joint mechanisms within the body 1210. For example, an actuator internal or external to the body 1210 may provide an electrical or mechanical signal to a joint mechanism to cause the joint mechanism to extend or contract a protrusion from the joint mechanism, and thereby cause a movement of the body 1210. For another example, an actuator internal or external to the body 1210 may provide an electrical or mechanical signal to turn a protrusion from the body 1210 (e.g., a wheel or rudder) and thereby cause the body 1210 to change direction. Other steering mechanisms 1215 are also within the scope of the present disclosure. A steering mechanism 1215 may include multiple actuators, multiple types of actuators, and/or multiple types of actuator control.

The position sensor 1220 provides information related to measurements of absolute or relative position of the body 1210. The position sensor 1220 may be positioned at any point on the continuum manipulator 1200, and may be internal to the body 1210 or at an external surface of the body 1210. Multiple position sensors 1220 may be used in the continuum manipulator 1200, and the multiple position sensors 1220 may be of the same type or different types.

Examples of position sensing by position sensor 1220 includes two-dimensional position information, such as absolute or relative position within a plane; three-dimensional position information, such as absolute or relative position within an xyz coordinate system or a polar coordinate system; information related to a change in position; accelerometer information; information related to pitch, yaw or roll; and global positioning system (GPS) information. In one or more embodiments, the position sensor 1220 provides information related to measurements of absolute or relative position of an actuator. The position sensor 1220 may incorporate multiple types of position sensing, such as, for example, both two-dimensional sensing and GPS sensing.

The force sensor 1225 provides information related to measurements of force on the body 1210. The force sensor 1225 may provide information related to measurement along a single axis (uni-axial), along two axes (bi-axial), or along three axes (tri-axial). The force sensor 1225 may be positioned at any point on the continuum manipulator 1200, and may be internal to the body 1210 or at an external surface of the body 1210. Multiple force sensors 1225 may be used in the continuum manipulator 1200, and the multiple force sensors 1225 may be of the same type or different types.

The controller 1230 is a computing device.

Figure 13:
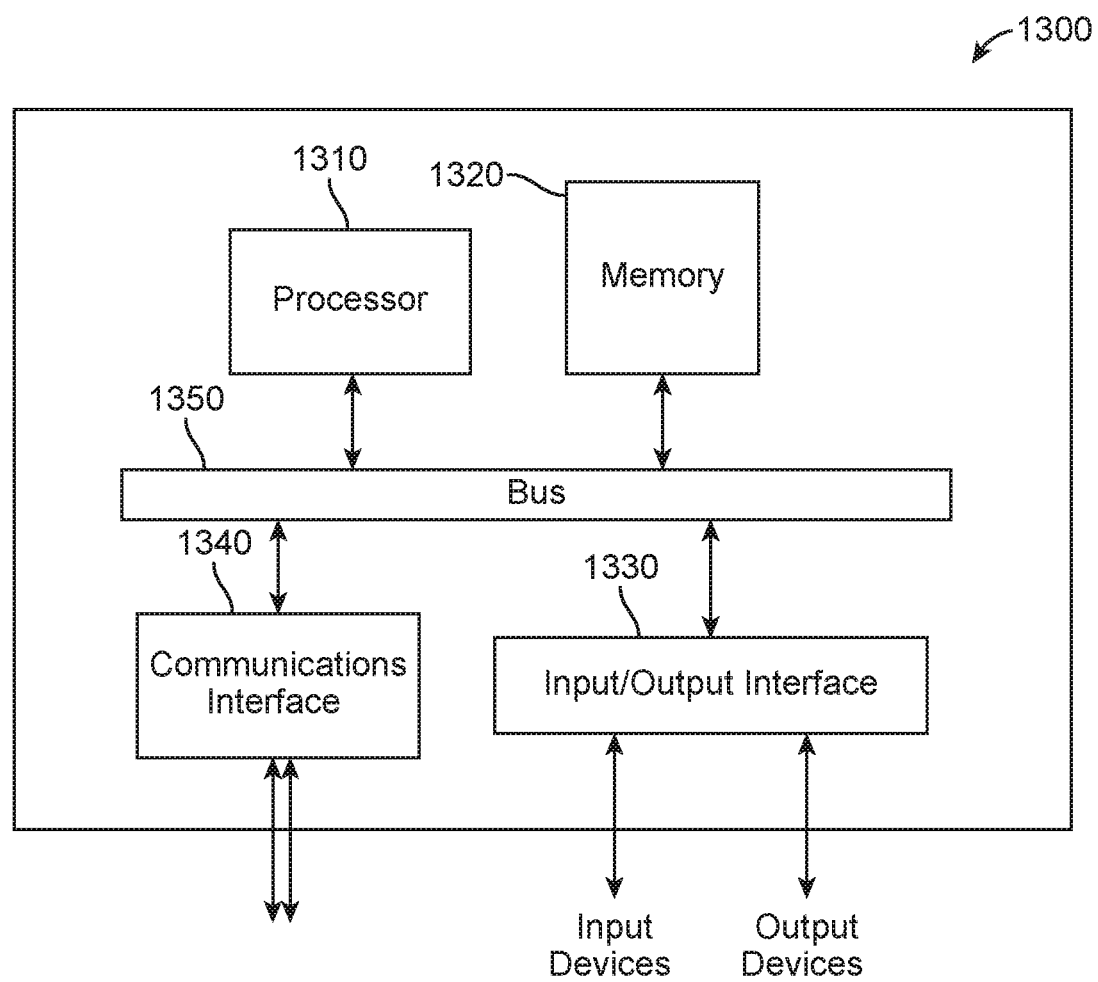
FIG. 13 is a block diagram of an example of a computing device.

FIG. 13 illustrates an example of a computing device 1300 (such as the controller 1230). The computing device 1300 includes a processor 1310, a memory 1320, an input/output interface 1330, and a communication interface 1340. A bus 1350 provides a communication path between two or more of the components of computing device 1300. The components shown are provided by way of illustration and are not limiting. Computing device 1300 may have additional or fewer components, or multiple of the same component.

Processor 1310 represents one or more of a general-purpose processor, digital signal processor, microprocessor, microcontroller, application specific integrated circuit (ASIC), field programmable gate array (FPGA), other circuitry effecting processor functionality, or a combination thereof, along with associated logic and interface circuitry.

Memory 1320 represents one or both of volatile and non-volatile memory for storing information (e.g., instructions and data). Examples of memory include semiconductor memory devices such as EPROM, EEPROM, flash memory, RAM, or ROM devices, magnetic media such as internal hard disks or removable disks or magnetic tape, magneto-optical disks, CD-ROM and DVD-ROM disks, holographic disks, and the like.

Portions of the controller 1230 may be implemented as computer-readable instructions in memory 1320 of computing device 1300, executed by processor 1310.

Input/output interface 1330 represents electrical components and optional code that together provide an interface from the internal components of computing device 1300 to external components. Examples include a driver integrated circuit with associated programming.

Communication interface 1340 represents electrical components and optional code that together provides an interface from the internal components of computing device 1300 to external networks. Communication interface 1340 may be bi-directional, such that, for example, data may be sent from computing device 1300, and instructions and updates may be received by computing device 1300.

Bus 1350 represents one or more interfaces between components within computing device 1300. For example, bus 1350 may include a dedicated connection between processor 1310 and memory 1320 as well as a shared connection between processor 1310 and multiple other components of computing device 1300.

An embodiment of the disclosure relates to a non-transitory computer-readable storage medium (e.g., a memory 1320) having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the embodiments of the disclosure, or they may be of the kind well known and available to those having skill in the computer software arts.

Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

As used herein, the terms "substantially," "substantial," "approximately," "nearly" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, technique, operation or operations, to the objective, spirit and scope of the disclosure. All such modifications are intended to be within the scope of the claims appended hereto. In particular, while certain techniques may have been described with reference to particular operations performed in a particular order, it will be understood that these operations may be combined, sub-divided, or re-ordered to form an equivalent technique without departing from the teachings of the disclosure. Accordingly, unless specifically indicated herein, the order and grouping of the operations is not a limitation of the disclosure.

What is claimed is:

1. A continuum manipulator, comprising:
   a body;
   a steering mechanism configured to steer the body;
   at least one position sensor configured to detect a position of the body;

at least one force sensor configured to detect a force against the body; and a controller configured to
receive position information from the at least one position sensor and force information from the at least one force sensor;
provide control commands to the steering mechanism based on the position information and the force information; and
update a control matrix based on the position information and the provided control commands.

2. The continuum manipulator of claim 1, the controller further configured to estimate an amount of contact between the body and a surface, and update the control matrix based on the amount of contact.

3. The continuum manipulator of claim 1, wherein at least one of the at least one force sensor provides tri-axial measurements of force.

4. The continuum manipulator of claim 1, wherein at least one of the at least one position sensor includes an accelerometer.

5. The continuum manipulator of claim 1, wherein the control commands are determined based in part on the control matrix.

6. The continuum manipulator of claim 5, wherein the control matrix is a Jacobian matrix.

7. The continuum manipulator of claim 6, wherein the control commands include commands for controlling actuator displacement, and the Jacobian matrix relates actuator displacement to expected resultant changes in position of the body.

8. The continuum manipulator of claim 7, wherein the control commands are determined based on a weighting of the Jacobian matrix, the weighting providing for normalized actuator displacement values.

9. The continuum manipulator of claim 1, wherein to provide control commands to the steering mechanism based on the position information and the force information, the controller is configured to perform closed loop control based on stiffness metrics.

10. The continuum manipulator of claim 1, wherein to provide control commands to the steering mechanism based on the position information and the force information, the controller is configured to perform closed loop control based on a Jacobian transpose technique.

11. The continuum manipulator of claim 1, wherein to provide control commands to the steering mechanism based on the position information and the force information, the controller is configured to perform closed loop control based on one of continuous online estimation of stiffness or continuous online estimation of unaccounted losses in a force-torque mapping.

12. A method, comprising:
receiving position information and force information related to a continuum manipulator;
providing control commands to a steering mechanism of the manipulator based on the position information and the force information;
updating a control matrix based on the position information and the provided control commands; and
providing updated control commands to the steering mechanism based on the updated control matrix.

13. The method of claim 12, further comprising estimating an amount of contact between a body of the manipulator and a surface, and updating the control matrix based on the amount of contact.

14. The method of claim 12, wherein the force information includes tri-axial measurements of force.

15. The method of claim 12, wherein the position information includes information from an accelerometer.

16. The method of claim 12, wherein the control commands are determined based in part on the control matrix.

17. The method of claim 16, wherein the control matrix is a Jacobian matrix.

18. The method of claim 17, wherein the control commands include commands for controlling actuator displacement, and the Jacobian matrix relates actuator displacement to expected resultant changes in position of a body of the manipulator.

19. The method of claim 18, wherein the control commands are determined based on a weighting of the Jacobian matrix, the weighting providing for normalized actuator displacement values.

20. The method of claim 12, wherein the control commands are provided according to a closed loop control technique based on one of stiffness metrics, a Jacobian transpose technique, a continuous online estimation of stiffness, or a continuous online estimation of unaccounted losses in a force-torque mapping.

* * * * *